(12) United States Patent
Glaser (10) Patent No.: US 11,253,959 B2
(45) Date of Patent: Feb. 22, 2022

(54) METHOD AND DEVICE FOR FURNISHING SCREWS

(71) Applicant: M B N—MASCHINENBAUBETRIEBE NEUGERSDORF GMBH, Ebersbach-Neugersdorf (DE)

(72) Inventor: Mario Glaser, Schirgiswalde (DE)

(73) Assignee: M B N—MASCHINENBAUBETRIEBE NEUGERSDORF GMBH, Ebersbach-Neugersdorf (DE)

( * ) Notice: Subject to any disclaimer, the term of this patent is extended or adjusted under 35 U.S.C. 154(b) by 24 days.

(21) Appl. No.: 16/633,844

(22) PCT Filed: Jun. 27, 2018

(86) PCT No.: PCT/EP2018/067223
§ 371 (c)(1),
(2) Date: Jan. 24, 2020

(87) PCT Pub. No.: WO2019/029898
PCT Pub. Date: Feb. 14, 2019

(65) Prior Publication Data
US 2020/0206852 A1 Jul. 2, 2020

(30) Foreign Application Priority Data
Aug. 8, 2017 (DE) .................. 10 2017 117 961.5

(51) Int. Cl.
*B23P 19/00* (2006.01)
*B23P 19/06* (2006.01)
*B23Q 7/10* (2006.01)
(52) U.S. Cl.
CPC ............. *B23P 19/001* (2013.01); *B23P 19/06* (2013.01); *B23P 2700/50* (2013.01)

(58) Field of Classification Search
CPC ......... B23P 19/00; B23P 19/001; B23P 19/06; B23P 2700/50; B23Q 7/10
See application file for complete search history.

(56) References Cited

U.S. PATENT DOCUMENTS 7,090,077 B2 * 8/2006 Pally ....................... F16B 27/00
206/347
9,782,863 B2 * 10/2017 Izumiya ................. B23P 19/06
(Continued)

FOREIGN PATENT DOCUMENTS

CN 104440746 A 3/2015
DE 3530230 A1 * 3/1987 ............ B23P 19/001
(Continued)

OTHER PUBLICATIONS

Spindler et al.; Magazine for Loading Unit of Handling Device (DE 102009040764); EPO English Machine Translation; pp. 1-13 (Year: 2021).*

(Continued)

*Primary Examiner* — Bayan Salone
(74) *Attorney, Agent, or Firm* — Heslin Rothenberg Farley and Mesiti PC; Nicholas Mesiti (57) ABSTRACT

A device for furnishing screws, in particular on automated screwing systems includes a changing magazine having a plurality of screw holders that each have a closed position for holding in each case one screw in a non-positive manner and an open position for releasing the screw. The screw holder remains in its open position or in its closed position in the absence of a supply of energy A method for furnishing screws, in particular on automated screwing systems, relates to the device.

20 Claims, 5 Drawing Sheets

(56) References Cited

U.S. PATENT DOCUMENTS

2005/0036850 A1\* 2/2005 Pally ..................... F16B 27/00
                                                                              411/84
2016/0031051 A1\* 2/2016 Izumiya .................. B25J 11/00
                                                                             81/57.37

FOREIGN PATENT DOCUMENTS

| | | | | |
|---|---|---|---|---|
| DE | 3530230 | A1 | 3/1987 | |
| DE | 10162635 | A1 \* | 7/2003 | ............. F16B 27/00 |
| DE | 10162635 | A1 | 7/2003 | |
| DE | 10226164 | A1 | 10/2003 | |
| DE | 102009016372 | A1 | 10/2010 | |
| DE | 102009040764 | A1 \* | 3/2011 | ............ B21J 15/323 |
| DE | 102009040764 | A1 | 3/2011 | |
| DE | 102012224045 | A1 \* | 6/2014 | ............ B23P 19/06 |
| DE | 102012224045 | A1 | 6/2014 | |
| DE | 102018103674 | A1 \* | 8/2019 | ............ B23P 19/004 |
| EP | 2010356 | B1 \* | 4/2013 | ........... B60B 29/006 |
| EP | 2010356 | B1 | 4/2013 | |
| SU | 814710 | A1 | 3/1981 | |
| SU | 1153467 | A1 | 3/1987 | |
| SU | 1313699 | A1 | 5/1987 | |
| SU | 1425084 | A1 | 9/1988 | |
| WO | WO-2011029817 | A2 \* | 3/2011 | ............ B23P 19/001 |

OTHER PUBLICATIONS

International Search Report and Written Opinion issued in PCT/EP2018/067223 and dated Oct. 2, 2018.

\* cited by examiner

METHOD AND DEVICE FOR FURNISHING SCREWS

CROSS REFERENCE TO RELATED APPLICATIONS

This application is the National Phase filing under 35 U.S.C. § 371 of International Application No. PCT/EP2018/067223, filed on Jun. 27, 2018, and published on Feb. 14, 2019 as WO 2019/029898 A1, which claims priority to German Application No. 102017117961.5, filed on Aug. 8, 2017. The contents of each of the prior applications are hereby incorporated by reference herein in their entirety.

The invention relates to methods and devices for furnishing connecting elements such as screws or the like, in particular on automated screwing systems, as are used, for example, in the automotive industry.

BACKGROUND

EP2010356B1 describes a screwing system in which a plurality of screwing tools are combined in two groups, wherein in each case only the screwing tools of one of the two groups are required during a screwing operation, and proposes using a common drive device to drive in each case one screwing tool from each group in order to minimize the number of drive devices required.

DE102012224045A1 discloses a screwing system in which screws are not plugged in at the screwing points at the preassembly stage, but are fed individually to the screwdriver via an automatic feed device.

Since the number of screwing operations is greatly increasing in automobile construction, it is inefficient to use an individual adapter screwing spindle for each screw or to guide screws to the screwing point by way of individual loading.

DE10162635A1 describes a band-shaped screw magazine having linearly arranged receiving chambers from which a screw is broken out at the time of screwing. However, disposable magazines of such type are unsuitable for use on an industrial scale.

DE10226164A1 discloses a magazine in which a belt-like screw holder having a plurality of linearly arranged clamping devices is used for receiving screws in a magazine shaft.

DE102009016372A1 describes a screwdriver having a revolver magazine which is filled with screws by means of pre-equipped screw receptacles.

An object of the invention consists in specifying methods and devices for furnishing connecting elements such as screws or the like, in particular on automated screwing systems, that use a changing magazine for connecting elements such as screws and the like and allow the execution of a plurality of screwing operations within a short time.

SUMMARY OF THE INVENTION

According to one aspect of the invention, the changing magazine can hold a plurality of screws in an energy-free manner.

According to one aspect of the invention, the changing magazine can be connected in an interacting manner with a screwing system for dispensing a screw.

According to one aspect of the invention, the changing magazine can be interchangeable in order for an empty changing magazine to be able to be replaced quickly and in an uncomplicated manner by another, pre-equipped changing magazine.

According to one aspect of the invention, the changing magazine can be adaptable to different screw sizes and/or screw numbers.

According to one aspect of the invention, a screwing system can carry out a large number of screwing operations with a small number of screwing spindles using the proposed changing magazine.

It is possible by means of the proposed methods and devices for the system to be adapted to changing screwing points and screw sizes in a simple, quick and flexible manner.

To achieve the object, a device having the features of patent claim 1 and a method having the features of patent claim 13 are proposed. Advantageous embodiments and developments form the subject matter of the dependent claims.

What is proposed therefore is first of all a device for furnishing screws, in particular on automated screwing systems, which comprises a changing magazine having a plurality of screw holders which each have a closed position for holding in each case one screw in a force-fitting manner and an open position for releasing the screw, wherein the screw holder remains in its open position or in its closed position without supply of energy.

In other words, a proposed changing magazine has a plurality of screw holders which are designed to receive in each case one screw and which, as long as no energy is supplied from outside, secure the respective screw. If, by contrast, energy is fed to a screw holder from outside, the screw holder releases the screw such that the screw can be received, for example, by a screwing tool in order to carry out a screwing operation. By virtue of the fact that the screw holder requires no energy for holding the screw, a changing magazine of the proposed type that is loaded with screws can, without energy supply, be transported for example from a loading station, in which the screws have been inserted into the screw holders, to the use site, for example a workstation on an assembly belt, with the screws not being able to be lost and being held in in each case a defined position. The terms "open position" and "closed position" here make it clear that the screw holder has at least one movable part which exerts a force on the inserted screw in the closed position such that the screw is held in a predetermined position in a force-fitting manner.

According to one embodiment, there can be provision here that the screw holders are arranged spaced apart from one another along a rectilinear arrangement line. The changing magazine can thus be designed for receiving a very large number of screws. Should the screws be removed in succession from such a changing magazine, said magazine can for example be moved stepwise in a simple rectilinear movement such that all the screw holders are moved in succession to a transfer position in which the screw held in the screw holder can be released and received by a screwing tool.

According to another embodiment, there can be provision that the screw holders are arranged spaced apart from one another along a nonrectilinear, for example circular, arrangement line. As a result, the changing magazine can be configured in a relatively space-saving manner. Should the screws be removed in succession from such a changing magazine, said magazine can for example be moved stepwise in a simple rotational movement such that all the screw holders are moved in succession to a transfer position in which the screw held in the screw holder can be released and received by a screwing tool.

The screw holder can have for example at least one movable holding element which exerts a transverse force on the screw in the closed position. What is meant here by a transverse force is a force which acts perpendicularly to a longitudinal axis of the screw, that is to say the screw is held on its shaft.

For this purpose, the holding element can for example comprise at least one pivotable pivot lever. This pivot lever can for example be held by its intrinsic weight, but alternatively or additionally also by the force of a first spring in the closed position, that is to say be pressed toward the screw, or be held by the force of the first spring in the open position. Furthermore, a first latching mechanism can be arranged in such a way that the pivot lever is securely held in the closed position, in particular if the pivot lever is held only by its intrinsic weight or against the force of the first spring in the closed position. Pivot levers are of mechanically simple design and therefore inexpensive to produce, robust and functionally reliable.

Alternatively or additionally, the holding element can comprise at least one displaceable clamping jaw. This clamping jaw can be held for example by its intrinsic weight, but alternatively or additionally also by the force of a second spring in the closed position, that is to say be pressed toward the screw, or be held by the force of the second spring in the open position. Furthermore, a second latching mechanism can be arranged in such a way that the clamping jaw is held securely in the closed position, in particular if the clamping jaw is held only by its intrinsic weight or against the force of the second spring in the closed position. Clamping jaws are also of mechanically simple design and therefore inexpensive to produce, robust and functionally reliable.

The holding element advantageously comprises a combination of at least one pivot lever and at least one clamping jaw.

For example, the pivot lever can be mounted on the changing magazine so as to be pivotable against the force of a first spring, and the clamping jaw can be mounted on the pivot lever so as to be displaceable on the free end of the pivot lever against the force of a second spring. In such an embodiment, the pivot lever is pressed by the first spring either up to the screw or away from the screw, and the clamping jaw can hold screws of different diameter in the closed position of the pivot lever, because their relative movability makes it possible to compensate for the different diameters.

The pivotability of the pivot lever "against the force of a first spring" can mean here that the first spring presses the pivot lever into the closed position without external energy supply and a movement into the open position is possible only by an external force counteracting the spring force. However, it can also mean that the first spring presses the pivot lever into the open position without external energy supply and a movement into the closed position is possible only by an external force counteracting the spring force. The same correspondingly applies to the displaceability of the clamping jaw with respect to the second spring.

Furthermore, there can be provision in the proposed device that the changing magazine can be mounted on a magazine holder which is arranged in the working region of at least one screwing tool of a screwing system. The changing magazine is here advantageously, but not necessarily, movably mounted relative to the magazine holder.

The magazine holder can for example be a stand-alone assembly which is installed in a positionally fixed manner and which is approached by a screwing tool in order to receive a new screw between two screwing operations. However, it can also be a constituent part of a screwing system in which one or more screwing tools are movable for example in space or in a plane in order, on the one hand, to remove screws from the changing magazine and, on the other hand, to approach different screwing points at which a screwing operation is to be carried out.

In order to allow a movable arrangement of the changing magazine on the magazine holder, there can be provision for example that the changing magazine has at least one first guide rail which, together with a second guide rail arranged on the magazine holder, can be assembled to form a linear guide. What is to be understood here by a linear guide is not necessarily a rectilinear linear guide. Particularly in the cases in which the screw holders are arranged for example in a circular manner, as already described above, it is expedient that the guide rails are also circular. However, it is also advantageously possible precisely in these embodiments for other bearing types, for example a rotary bearing arranged in the center of the circle, to be advantageously provided.

To move the changing magazine relative to the magazine holder, there can for example be arranged on the magazine holder a drive device which, if the changing magazine is mounted on the magazine holder, is operatively connected to the changing magazine in order to move the changing magazine relative to the magazine holder. Alternatively, there can be arranged on the changing magazine a drive device which, if the changing magazine is mounted on the magazine holder, is operatively connected to the magazine holder in order to move the changing magazine relative to the magazine holder. Preference is given, however, to the first-mentioned embodiment because the changing magazine thus manages completely without dedicated energy supply. The drive device can be configured for example as a servomotor having a pinion which engages in a rack arranged on the changing magazine and thus moves the changing magazine relative to the magazine holder.

Advantageously, there can be provision in the proposed device that, to move the changing magazine relative to the magazine holder, the drive device is designed in such a way that the screw holders are moved in succession to a transfer position. What is intended to be understood here by a transfer position is a position which is positionally fixed relative to the magazine holder and at which a screwing tool can be arranged or which can be approached by a screwing tool, and at which the release of the held screw and its transfer to a screwing tool occur in that the screwing tool is moved toward the screw head in the direction of the longitudinal axis of the screw and grips the screw head.

An advantage of such a defined transfer position consists, in embodiments in which the screwing tool receives a screw at the changing magazine and transports it to the current screwing point, in that the programming of the screwing system is facilitated by virtue of the fact that the screwing tool can approach one and the same position again and again in order to receive a new screw, and, in embodiments in which the magazine holder is connected to the screwing tool, in that the changing magazine held on the magazine holder is a constituent part of the screwing tool and is moved therewith from screwing point to screwing point, wherein the screwing tool, if it has arrived at the screwing point, has only to be moved forward in order to grip a screw and then to screw it, and is subsequently moved rearward in order that the magazine can be moved further by a unit spacing in order to furnish a new screw in the direction of movement of the screwing tool.

A further advantage of such a defined transfer position consists in the fact that the release of the screw by the screw holder is facilitated in a completely passive, that is to say energy-free, changing magazine in that the actuation of the screw holder, that is to say the movement from the closed position into the open position, always occurs at the same position by supplying energy from outside, as will be explained in detail below:

In the proposed device, it is possible for example for each screw holder to have an opening device which is designed to bring the screw holder from the closed position into the open position with energy supply. Here, the supply of different energy forms is conceivable and is intended to be covered as well by the idea of the invention. For example, the energy can be supplied by virtue of the fact that the screw holder is opened by action of an external force. It is equally possible, however, to move the screw holder from the closed position into the open position by action of a magnetic or electromagnetic field. Also covered as well are embodiments in which the opening of the screw holder is induced by heat or electric current, for example by the screw holder having an actuator which has an element composed of a shape memory alloy which ultimately, by change of shape, brings about an opening of the screw holder and thus the release of the held screw.

If the device has a screw holder which is opened by action of an external force, the opening device can be actuated for example by the action of an opening element not belonging to the changing magazine. Such an opening element can be arranged for example on the magazine holder or on a screwing tool of a screwing system.

If a screw holder is situated at the transfer position, an opening element situated on the magazine holder can actuate the opening device of the screw holder either by means of a dedicated actuator or by virtue of the fact that the opening device of the screw holder collides with the opening element upon approaching the transfer position, with the result that said screw holder is moved into the open position and releases the held screw.

If, by contrast, the opening element is arranged on a screwing tool of a screwing system, it is possible, after the screwing tool has gripped the screw, for said opening element to actuate the opening device of the screw holder such that the latter is moved into the open position and releases the held screw.

Also proposed is a method for furnishing screws, in particular on automated screwing systems, which comprises the following steps:

equipping a changing magazine with a plurality of screws in that at least one screw holder of the changing magazine is opened, one or in each case one screw is inserted into the or in each case one opened screw holder of the changing magazine, and the at least one opened screw holder is closed, and moving the equipped changing magazine into a working region of at least one screwing tool of a screwing system.

The method can further comprise the following step:

movably mounting the changing magazine on a magazine holder which is arranged in the working region of at least one screwing tool of a screwing system.

The method can further comprise the following step:

stepwise movement of the changing magazine in such a way that all the screw holders are moved in succession into a defined transfer position.

The method can further comprise the following step:

removing at least one screw from the changing magazine by at least one screwing tool in that the screw is gripped by the screwing tool, and the screw holder is moved from the closed position into the open position, and the screwing tool removes the screw from the screw holder.

BRIEF DESCRIPTION OF THE DRAWING FIGURES

Various aspects of the proposed methods and devices will be explained in more detail below with reference to an exemplary embodiment and associated drawings, in which.

DETAILED DESCRIPTION

The changing magazine 1, which is illustrated in various views in FIGS. 1 to 4, comprises a plurality of screw holders 11 which are arranged spaced apart from one another on a rectilinear arrangement line. An opening device 12 is arranged between in each case two screw holders 11 such that each screw holder 11 is assigned an opening device 12 which serves for the automated movement of the screw holder from a closed position, in which a screw S is held, into an open position, in which the screw S is released.

Each screw holder 11 comprises two pivot levers 111 which can be pivoted toward one another and which are held in the open position by the action of in each case one first spring (not shown here) and can be moved into the closed position against the force of this first spring. In each case one clamping jaw 112 is fitted on the free ends of the pivot levers 111 so as to be mounted displaceably against the action of a second spring 113. The pivot levers 111 are lockable in the closed position, and the sprung mounting of the clamping jaws 112 ensures that a screw holder 11 can hold screws S of different diameters.

The opening device 12 is responsible both for locking the pivot levers 111 in the closed position and for releasing the pivot levers 111 from the closed position into the open position. It comprises two locking bolts 122 which are displaceable outward in the horizontal direction against the force of in each case one third spring 123. An actuating bolt 121 can be displaced vertically such that it brings about a horizontal outward movement of the two locking bolts 122, with the result that the two pivot levers 111 are unlocked and then pivoted outward from the closed position into the open position, that is to say away from the screw S.

The locking of the pivot levers 111 in the closed position is canceled by the outward movement of the locking bolts 122. At the same time, the two locking bolts 122 are locked in their outward position, that is to say the locking bolt 122 is held in this position against the force of the third spring

123. The pivot levers 111 released by the unlocking move from the closed position into the open position through the force of the two first springs (not shown here). If, upon loading the changing magazine with screws S, the pivot levers 111 are moved from the open position into the closed position against the force of the first springs, they are locked in said closed position while at the same time the locking of the locking bolts 122 is canceled and they are moved back again into the inward position through the force of the third springs 123.

The alternating arrangement of screw holders 11 and opening devices 12 is held together by two laterally arranged strips on each of which there is arranged a first guide rail 13. In addition, the changing magazine 1 has a rack 14.

The magazine holder 2, which is illustrated in various views in FIGS. 5 to 8, comprises a base frame 21 having an opening element which, in the concrete exemplary embodiment, comprises a pin 221, which is fastened to a base plate 222, and two short-stroke cylinders 223 which can move the base plate 222 with the pin 221 up and down.

Also mounted on the base frame are two second guide rails 23 into which the changing magazine 1 can be inserted by its first guide rails 13. In the concrete exemplary embodiment, the two second guide rails 23 are of segmented configuration, that is to say in each case two short, colinearly arranged rail segments form a second guide rail 23 which, as a fixed bearing of a linear guide, receives a first guide rail 13 of the changing magazine 1 as a loose bearing of the linear guide.

Additionally mounted on the base frame 21 is a drive device 24 which, in the concrete exemplary embodiment, comprises a servomotor 241 and a pinion 242 which is mounted on the motor shaft of the servomotor 241.

Figure 1:
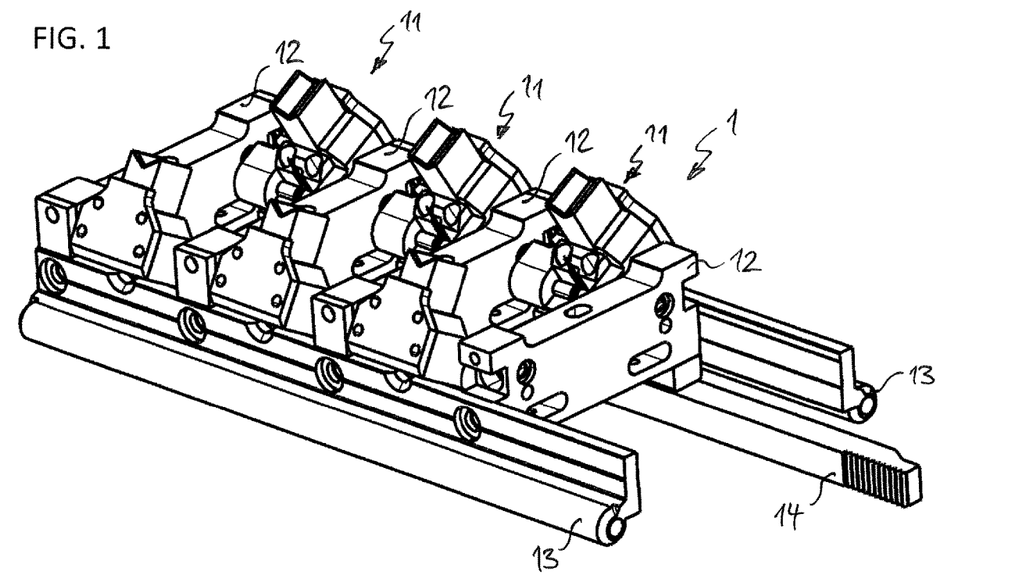
FIG. 1 shows a perspective view of a changing magazine.
Figure 2:
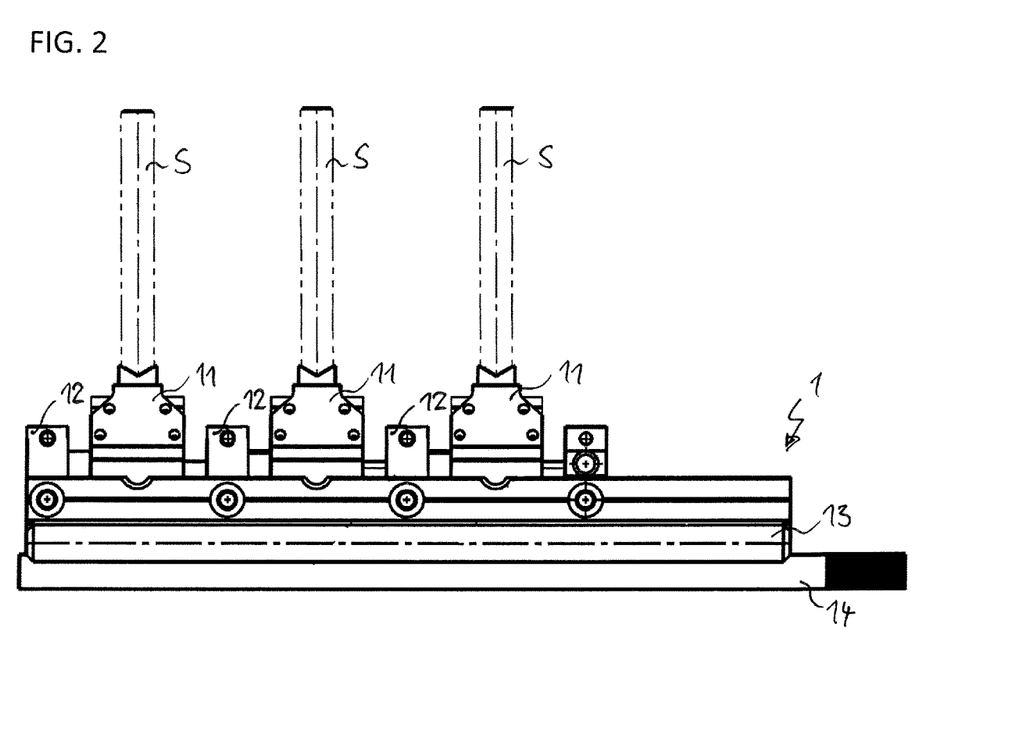
FIG. 2 shows a side view of the changing magazine.
Figure 3:
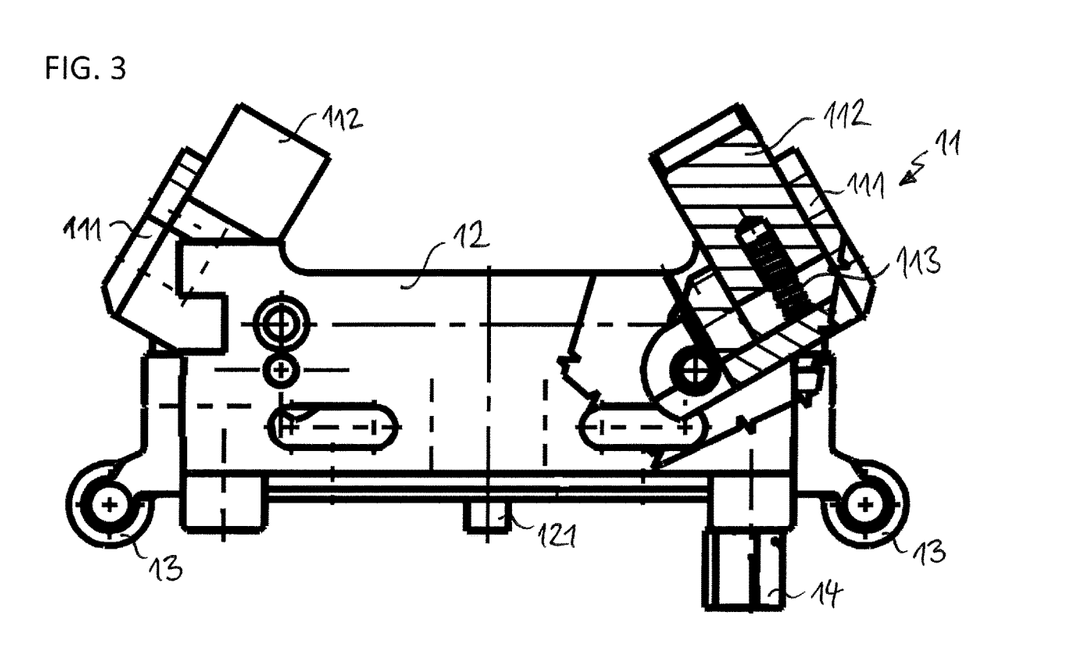
FIG. 3 shows a first cross section of the changing magazine.
Figure 4:
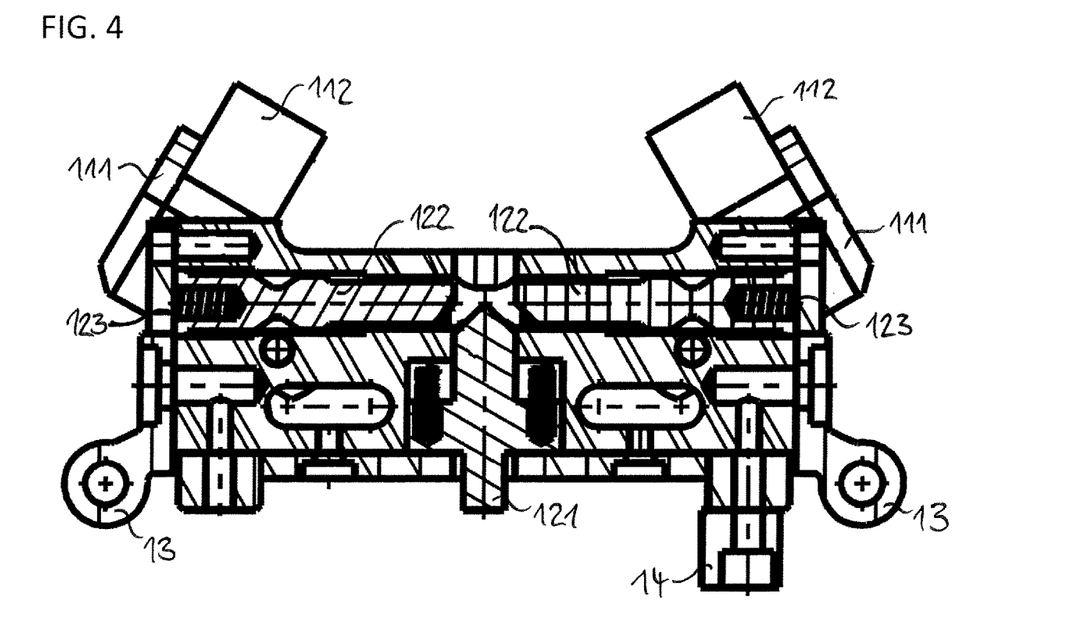
FIG. 4 shows a second cross section of the changing magazine.
Figure 5:
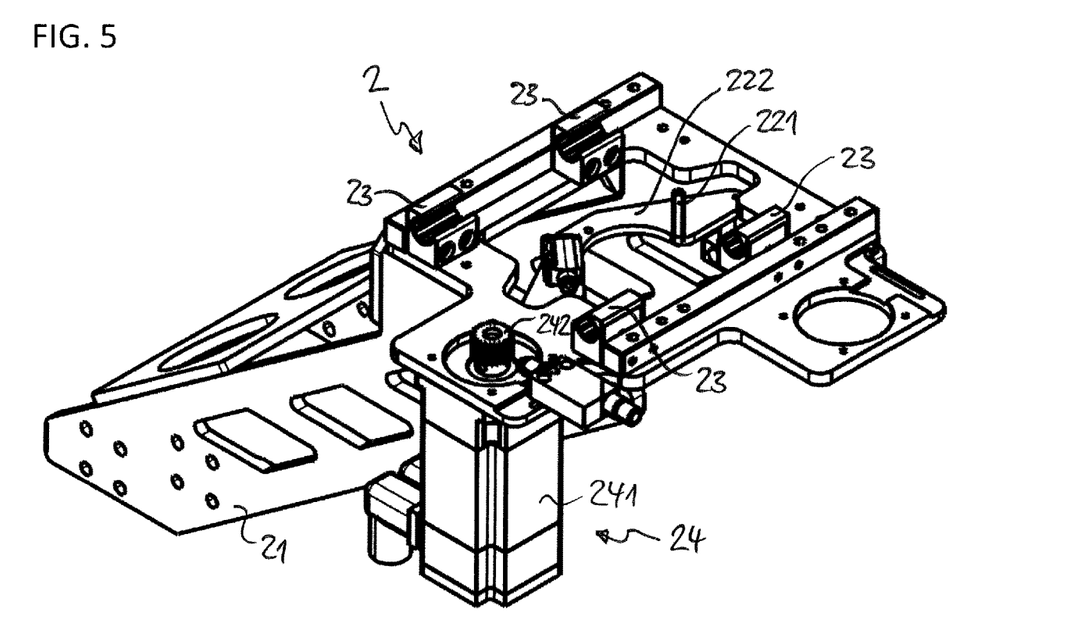
FIG. 5 shows a perspective view of a magazine holder.
Figure 6:
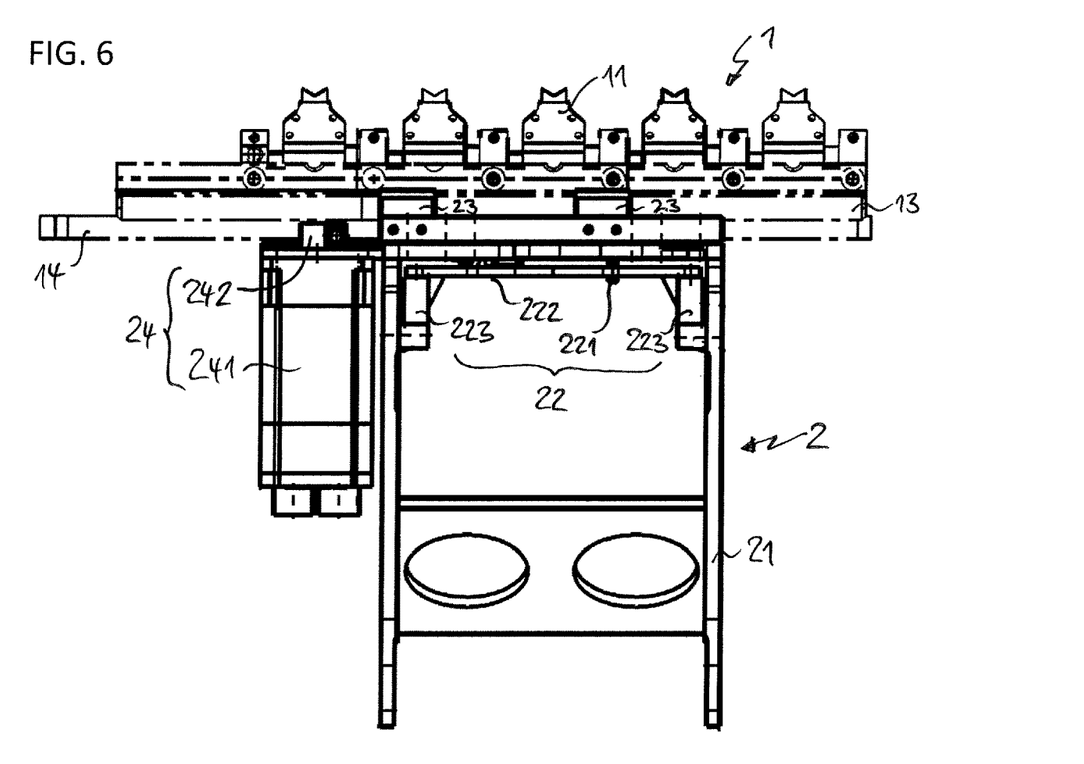
FIG. 6 shows a side view of the magazine holder with a changing magazine arranged thereon.
Figure 7:
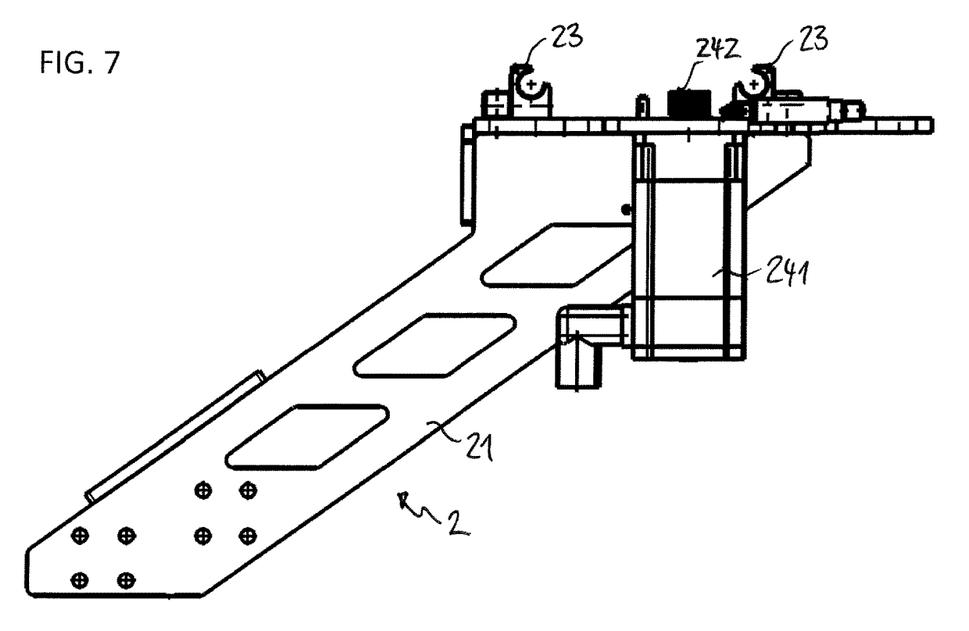
FIG. 7 and FIG. 8 show two further views of the magazine holder.

If, as illustrated in FIG. 6, the changing magazine 1 is inserted by its first guide rails 13 into the second guide rails 23 of the magazine holder 2, the changing magazine is displaceable along the thus formed linear guide relative to the magazine holder.

By virtue of the fact that, in the concrete exemplary embodiment, the pinion 242 of the servomotor 241 engages in the rack 14 of the changing magazine 1, the drive device 24 can bring about a stepwise displacement of the changing magazine 1 along the linear guide, with the result that all the screw holders 11 are gradually moved into a transfer position at which the screw held in the respective screw holder 11 can be received by a screwing tool.

Figure 8:
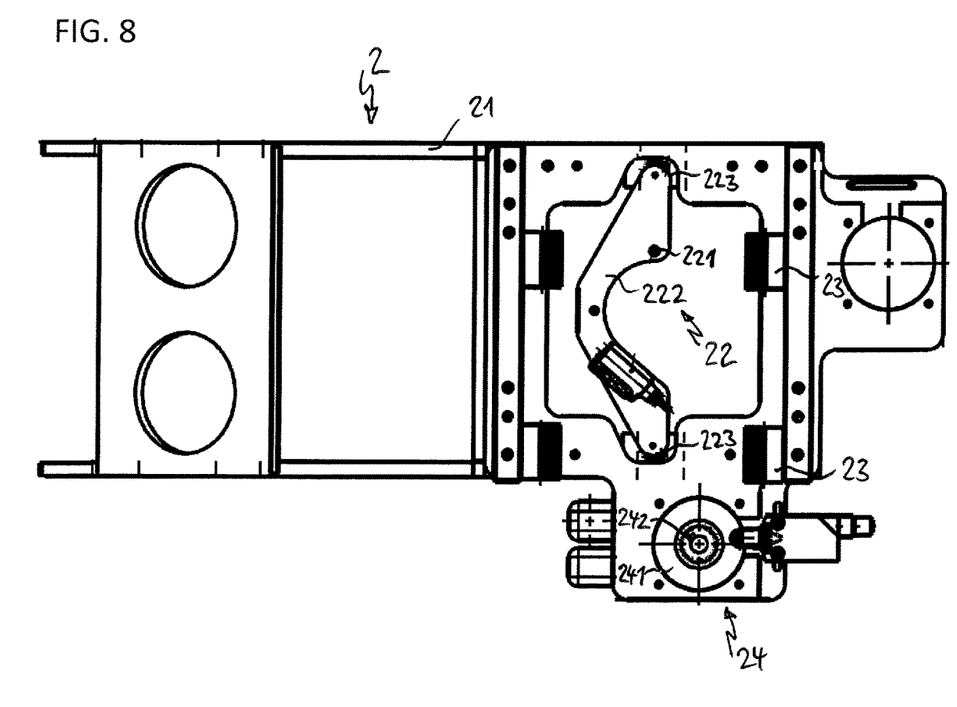
Figure 9:
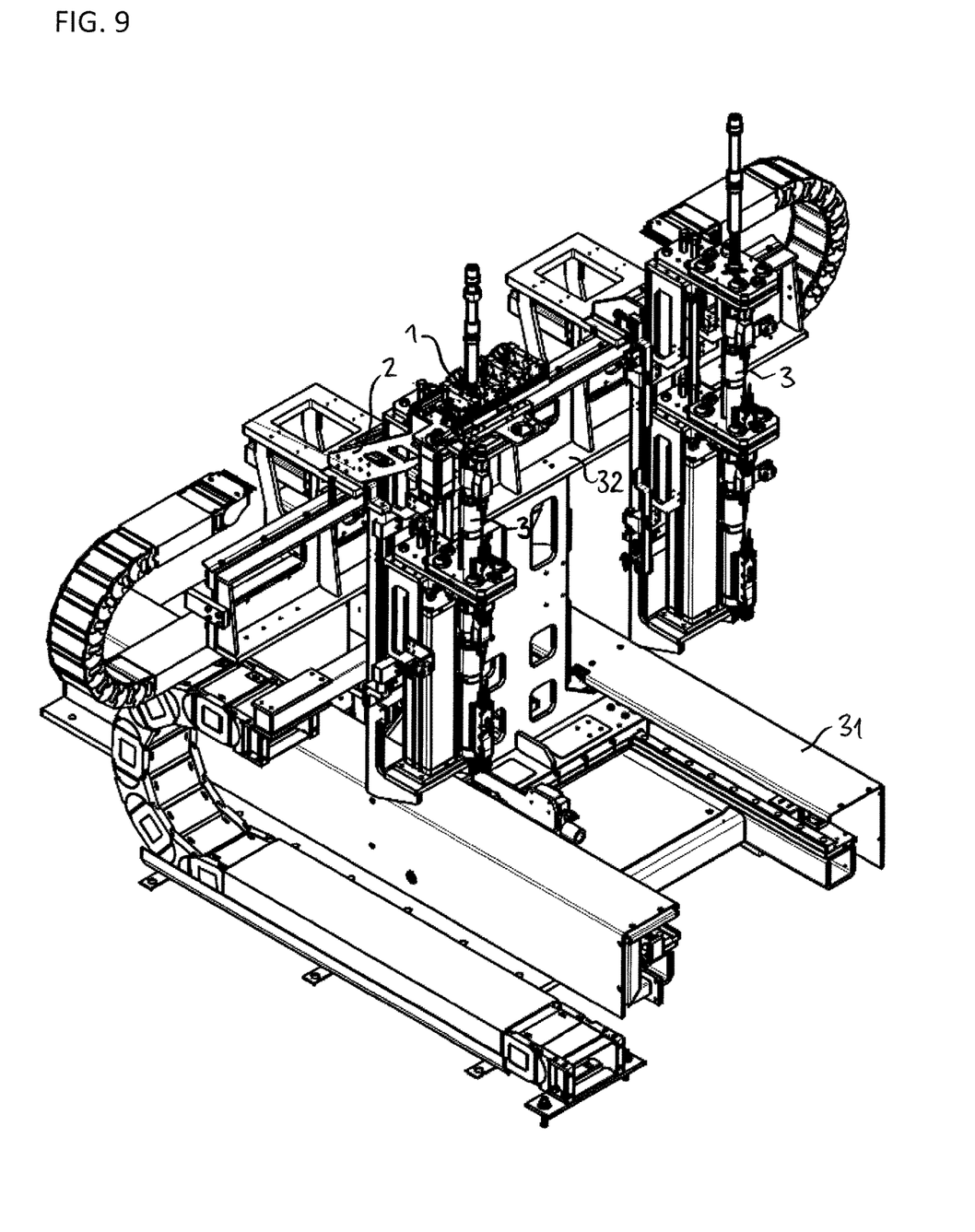
FIG. 9 shows a screwing system with screwing tools and a changing magazine which is mounted on a magazine holder.

In the exemplary embodiment, this transfer position is situated at the point which is marked in FIG. 8 by the cutout, visible in said figure, in the base plate 222 of the opening element 22. In this concrete exemplary embodiment, this cutout serves to allow the screwing tool arranged below to engage through after it has removed the screw S from the screw holder 11 currently situated at this transfer position. The changing magazine 1 itself is not illustrated in FIG. 8; however, it can be seen from FIG. 6 that the central one of the five screw holders illustrated there is currently situated at the transfer position. The screwing tool 3 itself is illustrated neither in FIG. 8 nor in FIG. 6; however, FIG. 9 shows an exemplary application in which all the previously described components interact as described below. However, it should be noted that the changing magazine described can be advantageously used in all its aspects with advantage on any desired screwing system, that is to say for example also on a 6-axis industrial robot or the like.

In the screwing system illustrated in FIG. 9 by way of example, two linear guides 31, 32 are arranged perpendicularly to one another in such a way that the two screwing tools 3 can be moved in the horizontal plane at any point in order to be able to screw screwing points arranged above the screwing system.

A magazine holder 2 is mounted in a positionally fixed manner with respect to the screwing tool 3 arranged to the left in the chosen illustration and is therefore moved with the screwing tool 3 in the horizontal plane. On the magazine holder 2 there is situated a changing magazine 1 which can be displaced stepwise relative to the magazine holder 2 and thus relative to the screwing tool 3 in such a way that each screw holder 11 can be moved into the transfer position. The transfer position can be seen in FIG. 9 at the screwing spindle of the screwing tool 3, said screwing spindle penetrating through the changing magazine 1 from the bottom up.

The screwing tool 3 arranged below the transfer position is length-adjustable. At first, the screwing tool 3 approaches the screw head of the screw S from below until a socket wrench arranged at the end of the screw spindle grips the screw head.

The short-stroke cylinders 223 then lift the base plate 222 with the pin 221 of the opening element 22, with the result that the pin 221 acts on the actuating bolt 121 of the opening device 12 which is assigned to the screw holder 11 which is currently situated at the transfer position. The actuating bolt 121 thus presses the two locking bolts 122 apart, with the result that the pivot levers 111 of the screw holder 11 are moved into the open position. The screwing spindle of the screwdriver 3 with the screw S can now be moved upward through the changing magazine 1 to the screwing point and carry out the screwing operation.

The screwing spindle is then retracted again until the socket wrench at the end of the screwing spindle is situated below the changing magazine 1. Actuating the drive device 24 causes the changing magazine 1 to be moved further relative to the magazine holder 2 and thus relative to the screwing tool 3 until the next screw holder 11 is situated in the transfer position, and the method starts afresh.

LIST OF REFERENCE SIGNS

1 Changing magazine
11 Screw holder
111 Pivot lever
112 Clamping jaw
113 Second spring
12 Opening device
121 Actuating bolt
122 Locking bolt
123 Third spring
13 First guide rail (loose bearing)
14 Rack
2 Magazine holder
21 Base frame
22 Opening element
221 Pin
222 Base plate
223 Short-stroke cylinder
23 Second guide rail (fixed bearing)
24 Drive device
241 Servomotor
242 Pinion
3 Screwing tool
S Screw

The invention claimed is:
1. A device for furnishing screws, in particular on automated screwing systems, comprising a changing magazine having a plurality of screw holders which have a closed position for holding a screw in a force-fitting manner and an open position for releasing the screw, wherein the screw holder remains in its open position without supply of energy.

2. The device as claimed in claim 1, in which the screw holders are arranged spaced apart from one another along a rectilinear arrangement line.

3. The device as claimed in claim 1, in which the screw holder has at least one movable holding element which exerts a transverse force on the screw in the closed position.

4. The device as claimed in claim 3, in which the holding element comprises a pivotable pivot lever which is held in the closed position by its intrinsic weight and/or the force of a first spring and/or a first latching mechanism.

5. The device as claimed in claim 3, in which the holding element comprises a displaceable clamping jaw which is held in the closed position by its intrinsic weight and/or the force of a second spring and/or a second latching mechanism.

6. The device as claimed in claim 1, in which the changing magazine can be movably mounted on a magazine holder which is arranged in the working region of at least one screwing tool of a screwing system.

7. The device as claimed in claim 6, in which the changing magazine has at least one first guiderail which, together with a second guiderail arranged on the magazine holder, can be assembled to form a linear guide.

8. The device as claimed in claim 6, in which there is arranged on the magazine holder a drive device which, if the changing magazine is mounted on the magazine holder, is operatively connected to the changing magazine in order to move the changing magazine relative to the magazine holder.

9. The device as claimed in claim 8, in which, in order to move the changing magazine relative to the magazine holder, the drive device is designed to move the screw holders in succession to a transfer position.

10. The device as claimed in claim 1, in which each screw holder has an opening device which is designed to bring the screw holder from the closed position into the open position with energy supply.

11. The device as claimed in claim 10, in which the opening device is actuated by the action of an opening element.

12. The device as claimed in claim 11, in which the opening element is arranged on the magazine holder or on a screwing tool of a screwing system.

13. A method for furnishing screws, in particular on automated screwing systems, comprising the following steps:

Equipping a changing magazine with a plurality of screws wherein
  at least one screw holder of the changing magazine is opened,
  a screw is inserted into the opened screw holder of the changing magazine, and
  the opened screw holder is closed, and
moving the equipped changing magazine in a working region of at least one screwing tool of a screwing system.

14. The method as claimed in claim 13, further comprising
  movably mounting the changing magazine on a magazine holder which is arranged in the working region of at least one screwing tool of a screwing system.

15. The method as claimed in claim 14, further comprising
  stepwise movement of the changing magazine in such a way that all the screw holders are moved in succession into a defined transfer position.

16. The method as claimed in claim 13, further comprising
  removing at least one screw from the changing magazine by at least one screwing tool wherein
  the screw is gripped by the screwing tool,
  the screw holder is moved from the closed position into the open position,
  and
  the screwing tool removes the screw from the screw holder.

17. The method as claimed in claim 15, further comprising
  removing at least one screw from the changing magazine by at least one screwing tool wherein
  the screw is gripped by the screwing tool,
  the screw holder is moved from the closed position into the open position, and
  the screwing tool removes the screw from the screw holder.

18. The device as claimed in claim 2, in which the screw holder has at least one movable holding element which exerts a transverse force on the screw in the closed position.

19. The device as claimed in claim 5, in which the changing magazine can be movably mounted on a magazine holder which is arranged in the working region of at least one screwing tool of a screwing system.

20. The device as claimed in claim 8, in which each screw holder has an opening device which is designed to bring the screw holder from the closed position into the open position with energy supply.

* * * * *